(12) United States Patent
Klehr

(10) Patent No.: US 11,101,089 B2
(45) Date of Patent: Aug. 24, 2021

(54) INDEPENDENT PRESSURE MONITORING SWITCH ELEMENT

(71) Applicant: Siemens Aktiengesellschaft, Munich (DE)

(72) Inventor: Stefan Klehr, Rheinzabern (DE)

(73) Assignee: Siemens Aktiengesellschaft, Munich (DE)

( * ) Notice: Subject to any disclaimer, the term of this patent is extended or adjusted under 35 U.S.C. 154(b) by 224 days.

(21) Appl. No.: 16/446,879

(22) Filed: Jun. 20, 2019

(65) Prior Publication Data

US 2019/0393007 A1 Dec. 26, 2019

(30) Foreign Application Priority Data

Jun. 22, 2018 (EP) .................................. 18179311

(51) Int. Cl.
*G01L 9/12* (2006.01)
*H01H 35/34* (2006.01)
(Continued)

(52) U.S. Cl.
CPC ............... *H01H 35/34* (2013.01); *F17D 5/06* (2013.01); *G01L 9/0041* (2013.01); *G01L 9/0044* (2013.01); *G01L 9/0089* (2013.01)

(58) Field of Classification Search
CPC ..... G01L 19/147; G01L 9/0042; G01L 19/04; G01L 9/0054; G01L 9/0072; G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618; G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672;
(Continued)

(56) References Cited

U.S. PATENT DOCUMENTS 3,643,510 A * 2/1972 Lissau ..................... G01L 19/04
73/708
5,132,500 A 6/1992 Clew
(Continued)

FOREIGN PATENT DOCUMENTS

CN 201688867 U 12/2010
CN 102545378 7/2012
(Continued)

OTHER PUBLICATIONS

Office Action dated Sep. 1, 2020 issued in Chinese Patent Application No. 2019105442400.
(Continued)

*Primary Examiner* — Andre J Allen
(74) *Attorney, Agent, or Firm* — Cozen O'Connor

(57) ABSTRACT

A pressure element for monitoring a fluid being applied to the pressure element, wherein the pressure element is configured to close an electrical circuit, as a result of a change in pressure which the fluid exerts on the pressure element,
(Continued)

independently of an absolute value of the pressure, where the fluid preferably flows through a pipeline.

22 Claims, 7 Drawing Sheets

(51) Int. Cl.
*F17D 5/06* (2006.01)
*G01L 9/00* (2006.01)

(58) Field of Classification Search
CPC ... G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16
USPC .................................................. 73/700–756
See application file for complete search history.

(56) References Cited

U.S. PATENT DOCUMENTS

| | | | |
|---|---|---|---|
| 5,437,189 A * | 8/1995 | Brown | G01L 9/0055 73/708 |
| 2004/0237660 A1 * | 12/2004 | Palmer | G01L 7/084 73/735 |
| 2005/0241400 A1 * | 11/2005 | Vossenberg | G01L 9/0042 73/754 |
| 2010/0327883 A1 * | 12/2010 | Reinmuth | G01L 9/0072 324/681 |
| 2017/0074737 A1 * | 3/2017 | Hamabe | H03K 17/975 |

FOREIGN PATENT DOCUMENTS

| | | |
|---|---|---|
| CN | 202394807 U | 8/2012 |
| CN | 202796730 U | 3/2013 |
| DE | 582011 | 8/1933 |
| DE | 617502 | 8/1935 |
| DE | 6911897 | 11/1969 |
| DE | 7040823 | 2/1971 |
| EP | 0507705 | 10/1992 |

OTHER PUBLICATIONS

Office Action dated May 7, 2021 issued in Chinese Patent Application No. 2019105442400.

* cited by examiner

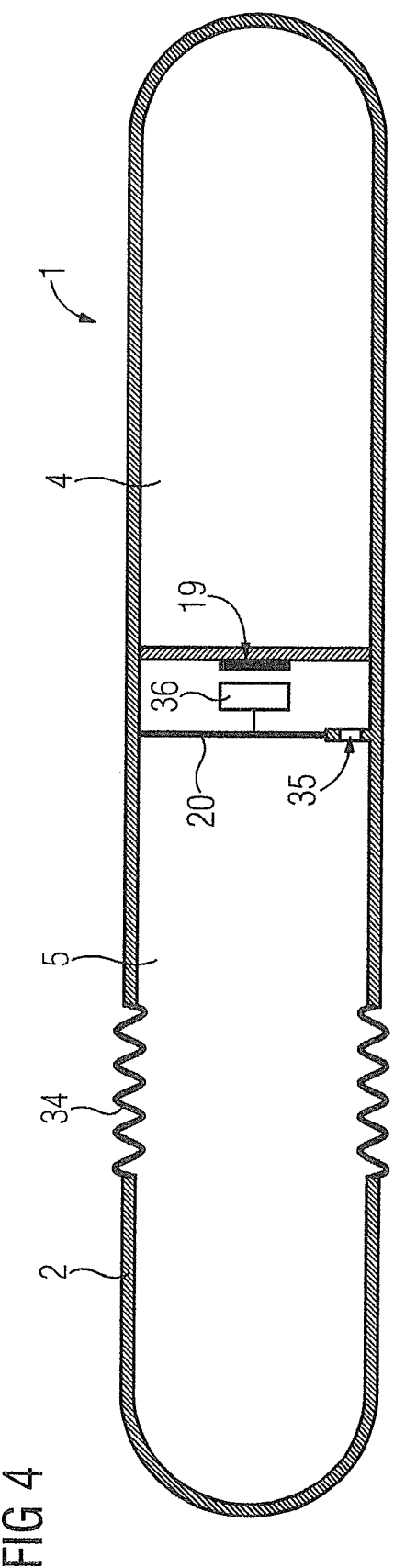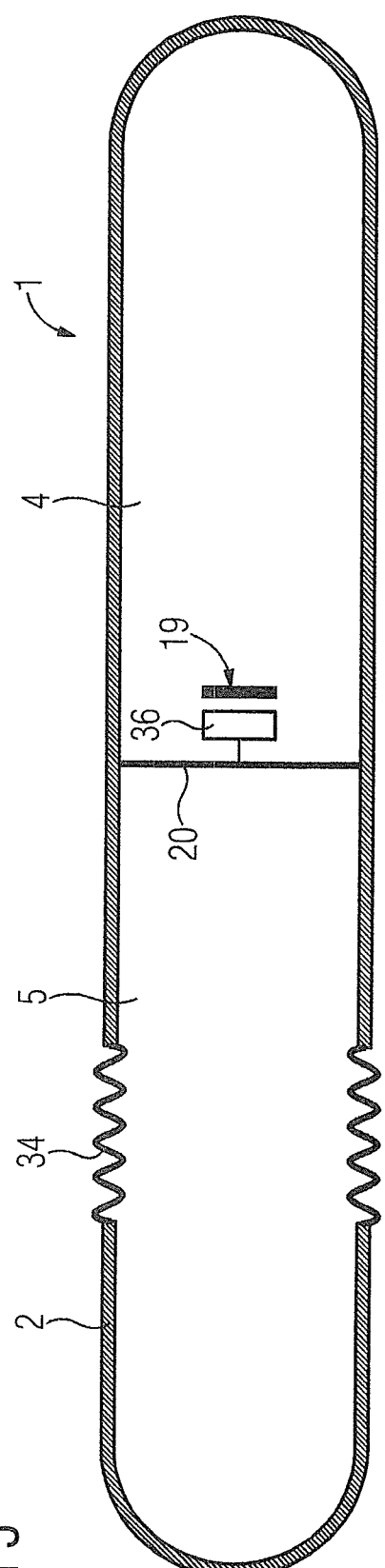

INDEPENDENT PRESSURE MONITORING SWITCH ELEMENT

BACKGROUND OF THE INVENTION

1. Field of the Invention

The invention relates to a pressure element for monitoring a fluid being applied to the pressure element, a pipeline, through which a fluid can flow, a pressure surge detection unit, a pressure surge monitoring system for pipelines through which fluid can flow and the use of at least one pressure element.

2. Description of the Related Art

In pipeline networks, such as in the field of drinking water supply, there is the risk of pipe breaks caused by pressure surges, which can arise as a result of the fluid dynamics. This problem occurs relatively frequently, meaning that drinking water supply companies have a particular interest in detecting pressure surge events and, in particular, pinpointing a possible pipe break.

In order to avoid pressure surges or at least to weaken their intensity, it is known to use what are known as mechanical water hammer arrestors at various points in the pipeline network. For example, DE 617 502 C or EP 0 507 705 A1 disclose apparatuses of this kind. Although the water hammer arrestors may attenuate pressure surges, they cannot provide any information regarding the pressure surge events.

In order to limit the harmful effects of the pressure surges, it is possible for previously calculated parameters relating to the material selection and wall thickness of the pipelines to be taken into consideration as part of the planning and construction of pipeline networks, in order to avoid pipe breaks. This approach is not viable in most cases, however, especially given that aging processes such as corrosion are not taken into consideration here.

It is also possible to distribute pressure sensors in the pipeline network and thus to monitor the pressure states continuously. As a result of the continuous pressure measurement that is required for this purpose, an adequate energy supply must be provided for every measuring point, which would entail a high energy and material outlay for the considerable length of pipeline networks (especially in the drinking water supply field). A battery solution would not be viable here.

In DE 7 040 823 U and DE 6 911 897 U each disclose a pressure switch with switching point adjustment for recording a pressure value of a fluid.

Also disclosed in DE 582 011 A is a pressure switch, which closes an electrical contact when a certain pressure threshold value of a fluid is exceeded, in order to interrupt the cooling procedure of a refrigerator, for example.

SUMMARY OF THE INVENTION

It is an object of the invention to provide an apparatus that enables an identification of changes in pressure, which may occur in a fluid, with little outlay.

This and other objects and advantages are achieved in accordance with the invention by a pressure element for monitoring a fluid being applied to the pressure element, a pipeline, through which a fluid can flow, a pressure surge detection unit, a pressure surge monitoring system for pipelines through which fluid can flow as claimed in claim 17 and by the use of at least one pressure element.

In accordance with the invention, the pressure element of the kind mentioned in the introduction is configured to close an electrical circuit, as a result of a change in pressure which the fluid exerts on the pressure element, independently of an absolute value of the pressure, where the fluid preferably flows through a pipeline.

In other words, the pressure element is configured such that it reacts to a rise and/or a drop in pressure exhibited by the fluid, and closes an electrical circuit. In this context, the pressure element may act as a switch or a sensing device. Depending on the topology of the electrical circuit, the pressure element may also open the electrical circuit, in order to bring about a comparable reaction. It is only essential that a measurable reaction occurs that can be recorded by subsequent components.

It is essential that an absolute value of the fluid pressure has no influence upon the function of the pressure element (with the exception of a maximum pressure valve), the exceeding of which would destroy the pressure element. A significant advantage of the pressure element is the independence from an absolute level of the pressure at which the fluid finds itself (what is known as the static pressure). As a result, the pressure element in accordance with the invention can be combined with all types of pipelines, in order to detect changes in pressure occurring therein, in particular pressure surges.

Preferably, the at least one pressure element is used for monitoring a pipeline through which fluid flows.

Preferably, the pressure element is configured to close the electrical circuit automatically when the change in pressure occurs in the pipeline, without utilizing an external, in particular electrical energy source. In this embodiment of the invention, the pressure element has a purely mechanical function. Changes in pressure of the fluid in the pipeline may therefore be detected without a (cable-bound or battery-based) electrical energy supply possibly being necessary for this purpose. There is also no need for any other type of external energy source (e.g., mechanical) for the functionality of the pressure element. The energy that is necessary for the functionality of the pressure element is exclusively provided by a change in pressure of the fluid in the pipeline.

Particularly preferably, the pressure element is configured to close the electrical circuit when a threshold value according to amount of the change in pressure of the fluid in the pipeline is exceeded. In other words, the pressure element closes the electrical circuit if a certain rate of change in pressure is exceeded in terms of its amount. At low rates of change in pressure (below the threshold value), i.e., at slow changes in pressure, the pressure element does not react with a closing of the electrical circuit. This does not, however, mean that the pressure element shows no reaction to the changes in pressure at all, when viewed as a whole. By a corresponding dimensioning of parameters of the pressure element, such as "tripping threshold" or "responsive dynamics", it is possible to cover a wide range of possible application areas.

In one advantageous embodiment of the invention, the pressure element has at least one flexible diaphragm, which in turn has a connection to a switching element. The connection between flexible diaphragm and the switching element is configured such that a movement or deflection of the diaphragm leads directly or indirectly to a movement of the switching element, in order to close the electrical circuit on a corresponding movement or deflection of the diaphragm. The diaphragm involves a flexible element which, in the event of a pressure being applied to a first outer side, reacts with a compensating movement in the direction of the pressure effect. Simultaneously, the diaphragm is impermeable for fluids, provided that it has no opening or the like. The combination of diaphragm and switching element connected thereto enables a particularly simple closing procedure of the electrical circuit.

As part of another embodiment, the pressure element has at least two diaphragms: A first diaphragm and a second diaphragm. The first diaphragm has a connection to a first switching element. This connection is configured such that, as a result of a positive change in pressure in the pipeline, the first diaphragm and the first switching element are moved such that the electrical circuit is closed. Correspondingly, the second diaphragm has a connection to a second switching element such that, as a result of a negative change in pressure in the pipeline, the second diaphragm and the second switching element are moved such that the electrical circuit is closed.

Due to the above-described embodiment of the invention, negative changes in pressure of the fluid pressure can also be detected in a particularly simple manner via the pressure element.

Preferably, the pressure element comprises an overload apparatus, which is configured to prevent an excessive mechanical loading on the at least one diaphragm. In this context, a deflection of the diaphragm can be limited by a structural measure such that the diaphragm itself does not become damaged at excessively high rates of change in pressure. Through the use of the overload apparatus, the diaphragm can additionally be formed comparatively thin, which can enable the detection of very low rates of change in pressure.

The pressure element may have at least one first chamber and a second chamber, where the diaphragm and the switching element are arranged in a central region between the two chambers. In this context, the diaphragm does not necessarily need to completely separate the two chambers from one another. Rather, there may also be provision for a direct opening between the two chambers. The diaphragm itself may also have an opening for a fluid to flow through.

Preferably, the pressure element has an additional third chamber, which has a first opening to the first chamber and a second opening to the second chamber, where the two openings have an opening cross-section which differs from one another. With the different openings, when changes in pressure of the fluid occur in the pipeline, different pressure ratios between the first and the second chamber may be created in a targeted manner, in order to induce a movement of the at least one diaphragm, which ultimately can lead to a closing of the electrical circuit (with a suitable rate of change in pressure of the fluid).

A compressible deforming facility is preferably arranged in the first chamber, which is configured to reversibly change its volume as a function of a pressure exerted upon it. With the aid of the deforming facility, it is possible for pressure differences between the first and second chamber to be implemented, so that the at least one diaphragm can move, in order to close the electrical circuit together with the switching element. The deforming facility is hermetically sealed off from the two chambers and is mechanically deformable. The size of the compressible deforming facility depends upon the specifications of the pressure element.

The compressible deforming facility may be a deforming body, which is filled with air or a gas and is formed in the manner of a balloon.

As an alternative, the compressible deforming facility has a subchamber that is separated from the first chamber from a flow perspective and comprises a spring and a piston. In this context, the piston is configured to exert a force on the spring when a force is exerted upon the piston, so that the volume of the subchamber and thus of the overall deforming facility is reversibly altered.

The compressible deforming facility may also be a bellows structure, which can be reversibly compressed on a change in pressure of the fluid being applied to the pressure element. Preferably, in this context the bellows structure is pressed together on a positive change in pressure of the fluid surrounding the pressure element and spread apart on a negative change in pressure of the fluid.

In one advantageous embodiment of the invention, the pressure element has a flexible separating diaphragm, which is formed such that the fluid can be applied to a first side of the separating diaphragm, and a fluid situated within the pressure element can applied to a second side of the separating diaphragm.

If a fluid being applied to the pressure element from the outside manages to enter the pressure element itself, this may result in dead volumes, in which germs may arise that may lead to contamination of the fluid, for example. In addition, solid particles transported by the fluid may enter the pressure element, whereby residue may arise that may lead to an impairment of the functioning of the pressure element. With the additional flexible separating diaphragm, it is possible to solve these problems in a highly efficient and simple manner, without the functionality of the pressure element possibly being impaired.

The above-described objects are likewise achieved by a pipeline, through which a fluid can flow, and which has at least one pressure element connected to the pipeline in accordance with the disclosed embodiments.

The above-described objects are also achieved by a pressure surge detection unit, which comprises a pressure element in accordance with the disclosed embodiments and a control unit, which is configured to record closure of the electrical circuit of the pressure element. In this context, the control unit is advantageously configured such that it only requires electrical energy when the electrical circuit is also closed. This enables a minimal energy consumption of the pressure surge detection unit and a wide range of applications.

In addition to the detection of the change in pressure, the control unit may provide an exact time stamp of the change event and have sensors for recording temperature, (absolute) pressure, humidity, vibration, brightness and the like.

The above-described objects are additionally achieved by a pressure surge monitoring system for pipelines through which fluid can flow. The pressure surge monitoring system comprises a plurality of pressure elements in accordance with the disclosed embodiments and at least one control unit, which is configured to record closure of the electrical circuit of the pressure element. With the aid the plurality of pressure elements, which are advantageously arranged distributed within the pipeline through which fluid can flow, it is possible to track a propagation of changes in pressure of the fluid within the pipeline. As a result, it is possible to draw conclusions about the point of origin of a change in pressure. For example, with the aid of the pressure surge monitoring system in accordance with the invention, any pipe break in the pipeline can be pinpointed simply and rapidly, in order to introduce corresponding measures at an early stage and in a targeted manner.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which these are achieved will now be described more clearly and explicitly with the following description of the exemplary embodiments, which are described in greater detail by reference to the figures, in which:

FIG. 4 shows a sectional image of a pressure element in accordance with the invention in a fourth embodiment;

FIG. 5 shows a second sectional image of the embodiment of FIG. 4;

DETAILED DESCRIPTION OF THE EXEMPLARY EMBODIMENTS

Figure 1:
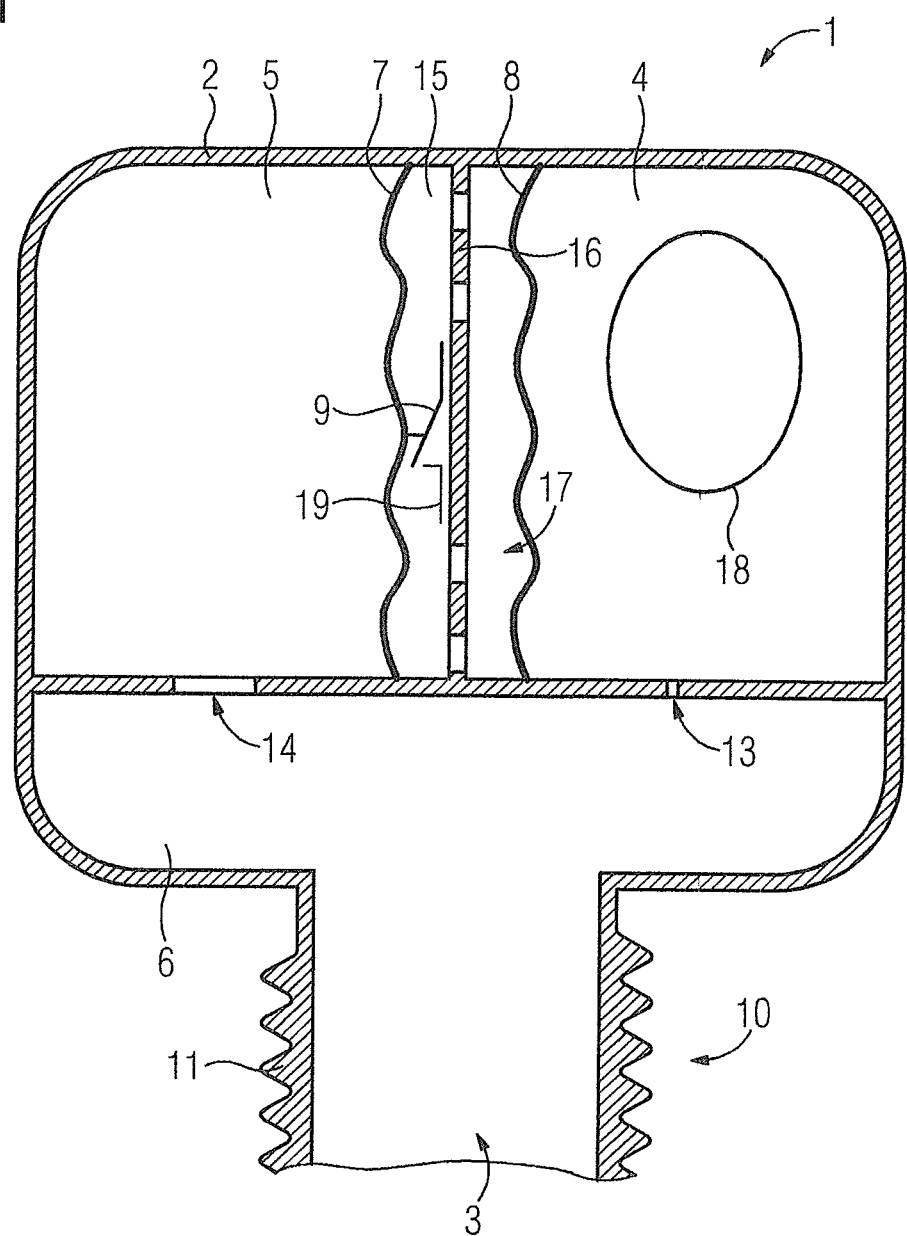
FIG. 1 shows a sectional image of a pressure element in accordance with the invention in a first embodiment.

FIG. 1 shows a flow diagram of a pressure element 1 in accordance with the invention, which is embodied as a pressure surge sensing device 1. The pressure surge sensing device 1 has a housing 2 made of a robust, pressure-proof material. Situated in the housing 2 is an opening 3, through which a fluid can flow into an interior of the housing 2. Furthermore, the pressure surge sensing device 1 comprises a first chamber 4, a second chamber 5 and a third chamber 6. In addition, the pressure surge sensing device 1 has a first diaphragm 7, a second diaphragm 8 as well as a switching element 9.

An outer wall 10 surrounding the opening 3 of the housing 2 has a thread 11, via which the pressure surge sensing device 1 can be fluidically connected to a pipeline 12 (not shown, see FIG. 8), for example. The three chambers 4, 5, 6 are filled with the fluid flowing into the pressure surge sensing device 1 from the outside (e.g., water from the pipeline 12) and are at the same fluid pressure. The first chamber 4 and the third chamber 6 are interconnected via a first opening 13. The second chamber 5 and the third chamber 6 are interconnected via a second opening 14. In the event of a change in pressure of a fluid being applied to the pressure element 1, pressure equalization currents through these openings 13, 14 occur, which are explained in more detail subsequently. A flow cross-section of the first opening 13 is smaller than a flow cross-section of the second opening 14.

Arranged between the first chamber 4 and the second chamber 5 are the two diaphragms 7, 8, which fluidically separate the two chamber 4, 5 from one another, i.e., no fluid can flow between the two chambers 4, 5 directly (without bypassing via the third chamber 6). The two diaphragms 7, 8 are arranged such that they are spaced apart from one another and enclose a fourth chamber 15, which is filled with a silicone oil, for example.

Situated in the fourth chamber 15 is a web 16, which is connected to the switching element 9 formed as a sensing device 9. The web 16 is permeable for the silicone oil due to openings 17 (shown dashed) embedded in the web. The sensing device 9 is mechanically connected to the first diaphragm 7 such that, when the diaphragm moves towards the sensing device 9 and a certain (switching) threshold is exceeded (induced by a corresponding rate of change in the fluid pressure), an electrical circuit 19 arranged on the web 16 is closed. The fourth chamber 15 between the diaphragms 7, 8 is filled with an electrically insulating liquid and is thus neutral with respect to the electrical parts situated therein. With electrical vias (not shown in FIG. 1) through the housing 2, the electrical terminals are guided outwards.

If the first diaphragm 7 moves away from the sensing device 9, then the electrical circuit 19 is interrupted or opened again when the switching threshold (including switching hysteresis) is exceeded. By way of constructive measures, the first diaphragm 7 can be hindered in its deflection in the case of an excessively large deflection using an overload bed, so that the diaphragm cannot be damaged. This enables the use of a relatively thin first diaphragm 7, meaning that switching thresholds are also possible at lower rates of change in pressure.

The first diaphragm 7 and the second diaphragm 8 are not subject to any system-dependent static differential pressure, which makes thin diaphragms 7, 8 possible.

Situated in the first chamber 4 is a deforming facility 18 formed as a compressible deforming body 18 which, upon a change in pressure within the first chamber 4, experiences a corresponding change in volume. The deforming body 18 is hermetically sealed and can be filled with air or gas. In this context, it is mechanically deformable and has a size which is defined according to the requirements.

The function of the pressure element 1 is described below:
On a rapid pressure rise of the fluid being applied to the opening 3 (i.e., with a comparatively high rate of change), only a small amount of fluid may flow through the smaller first opening 13 during the rise in pressure, so that a pressure equalization occurs via the larger second opening 14. The diaphragms 7, 8 are deflected in the direction of the first chamber 4 due to the negative pressure in the first chamber 4 or the positive pressure in the second chamber 5 and in so doing close the electrical circuit 19. In this context, the compressible deforming body 18 is compressed and ensures that pressure differences can occur at all between the first and second chamber 4, 5.

After the pressure rise event (fluid pressure is constant again or only continues to change slowly), the fluid continues to flow through the first opening 13 until the diaphragms 7, 8 are back in their basic state as a result of their reset forces. The electrical circuit 19 is again interrupted or opened.

On a correspondingly rapid pressure drop of the fluid, the same mechanism of action leads to the diaphragms 7, 8 moving in the direction of the second chamber 5. A (further or alternative) sensing device (not shown in FIG. 1) on the right side (in the drawing plane of FIG. 1) of the web 16, on a sufficiently high negative rate of change in pressure, accordingly closes the electrical circuit 19, which may be identical to the electrical circuit 19 that the first sensing device 9 closes, but this may not necessarily be the case. Here, a slow equalizing current also proceeds via the first opening 13, until the diaphragms 7, 8 again find themselves in their rest position. The switching threshold and the hysteresis of the pressure element 1 can be adjusted by corresponding parameterization inter alia of the openings 13, 14 as well as of the deforming body 18, the diaphragms 7, 8 and the chambers 4, 5, 6, 15.

Figure 2:
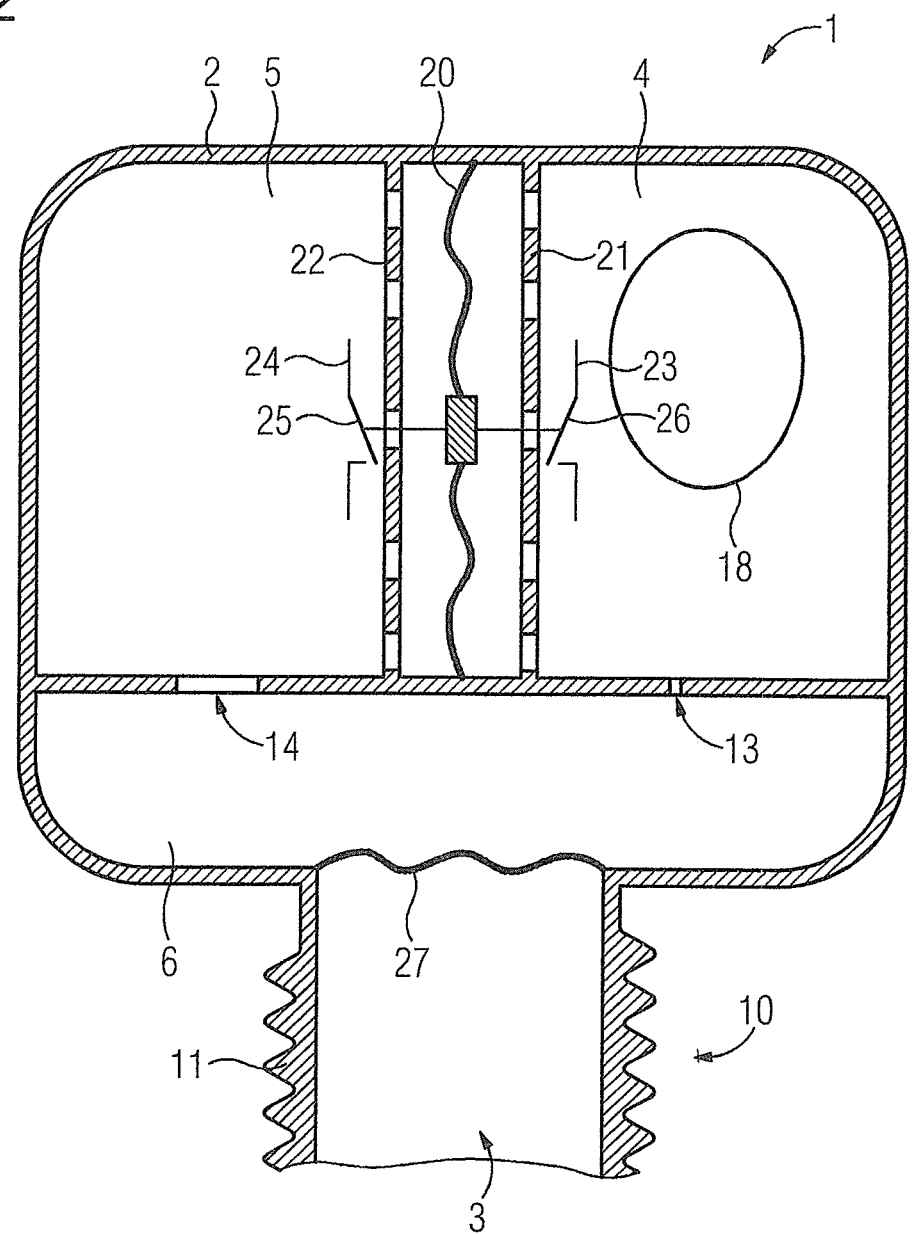
FIG. 2 shows a sectional image of a pressure element in accordance with the invention in a second embodiment.

FIG. 2 shows a second embodiment of a pressure element 1 in accordance with the invention. The mechanism of action of the second embodiment is the same as described previously. The pressure element 1, however, comprises only one diaphragm 20, as opposed to the pressure element 1 from FIG. 1. The first chamber 4, the second chamber 5 and the third chamber 6 are completely filled with a fluid (e.g., silicone oil). All mechanical components of the pressure element 1 are situated in the silicone oil. The pressure element has two webs 21, 22, of which one web is arranged in the first chamber 4 and one web in the second chamber 5. These webs 21, 22 function as limiting mechanisms and thus as an overload apparatus for the diaphragm 20.

A sensing device 23, 24 is attached to the webs 21, 22 in each case. The sensing devices 23, 24 are connected to the diaphragm 20 via a mechanical connection. A deflection of the diaphragm 20 towards the left (dropping fluid pressure) closes an electrical circuit 25 in the second chamber 5, where a deflection of the diaphragm 20 towards the right (rising fluid pressure) closes an electrical circuit 26 in the first chamber 4. Thus, via a single element 1, a bidirectional pressure change event can be detected.

In contrast to the embodiment of the invention of FIG. 1, in the second embodiment a separating diaphragm 27 closing off the opening 3 separates the interior of the pressure element 1 from the fluid situated outside. As a result, no dead volumes arise within the pressure element 1 and the particle-free fluid in the interior of the pressure element 1 cannot clog the first (smaller) opening 13 in particular.

A third embodiment of a pressure element 1 in accordance with the invention is shown. The principle of action of the pressure element 1 equates to that of the previously explained embodiments (FIGS. 1, 2). The pressure element 1 comprises only a first chamber 4 and a second chamber 5. The compressible deforming facility 18 has a subchamber 28 that is separated from the first chamber 4 from a flow perspective and comprises a spring 29 and a piston 30. Double O-ring seals 31 seal the subchamber 28 from the first chamber 4. The subchamber 28 contains a compressible gas. The first chamber 4 and the second chamber 5 are completely filled with silicone oil, for example, as in FIG. 2.

The piston 30 is configured to exert a force on the spring 29 when a force is exerted upon it (i.e., when the pressure in the first chamber 4 rises or falls), so that the volume of the subchamber 28 and thus of the overall deforming facility 18 is altered. The function corresponds to the deforming body 18 according to FIGS. 1 and 2.

A single diaphragm 20 separates the first chamber 4 from the second chamber 5. Both chambers 4, 5, however, are interconnected via a comparatively narrow channel 32, which is recessed into a separating wall 33. As a result, the silicone oil may experience a defined flow resistance in the event of an equalizing current (on a change in pressure).

In this exemplary embodiment, the diaphragm 20 is "relatively soft" and is not damaged even in the event of an overload, meaning that a mechanical limit stop is not necessary as protection. Here, as already described, the separating diaphragm 27 also separates the silicone oil filling from the fluid situated outside.

Figure 3:
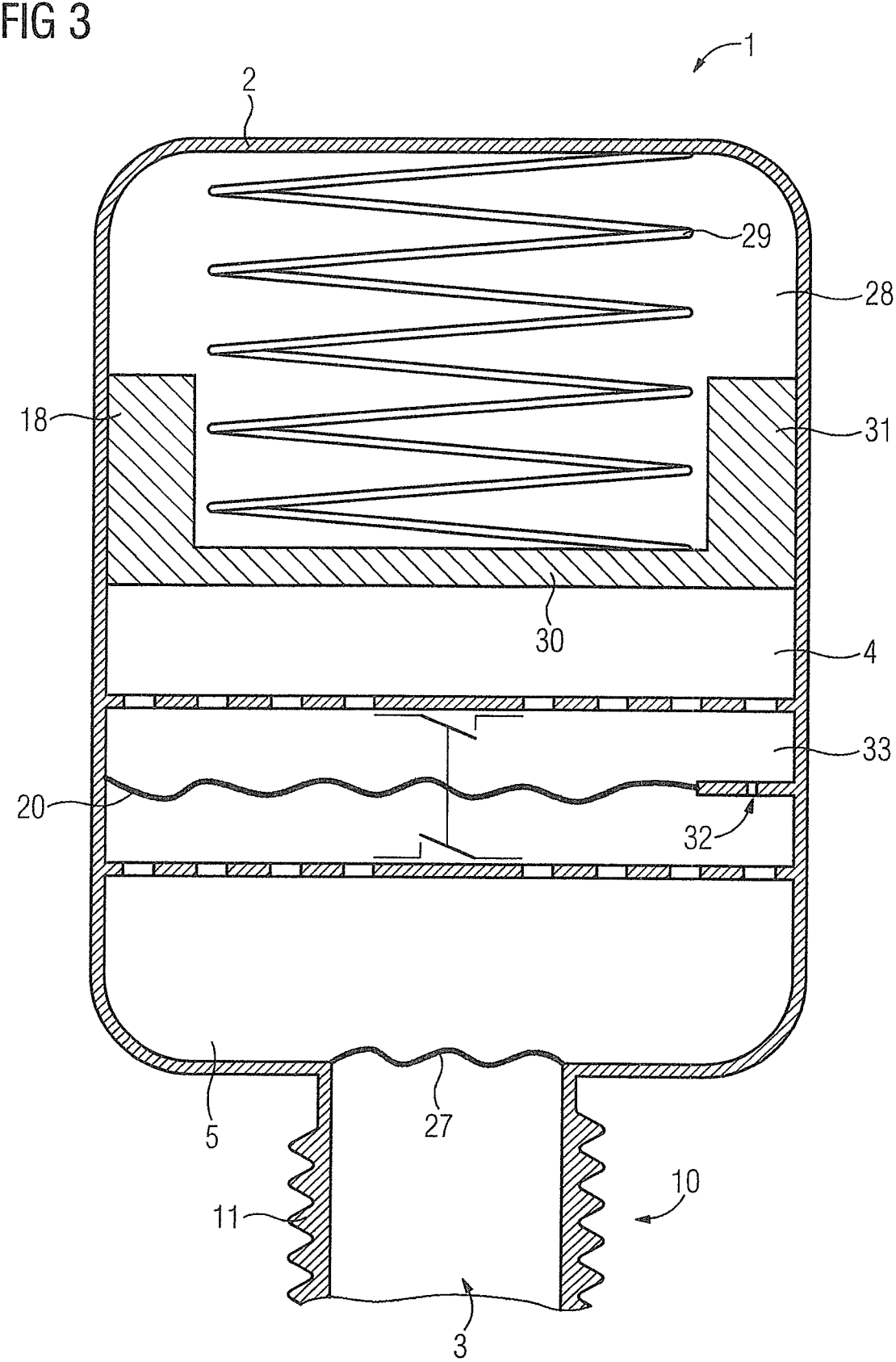
FIG. 3 shows a sectional image of a pressure element in accordance with the invention in a third embodiment.

FIG. 4 illustrates a fourth exemplary embodiment of the pressure element 1 in accordance with the invention. The pressure element 1 has an oval housing 2, which is hermetically sealed from the outside. The housing 2 is formed in a pressure-stable manner. Some of the housing 2, however, is formed as a bellows structure 34, which can contract and expand. The bellows structure 34 functions as a deforming facility 18, which fulfills a comparable function as the compressible deforming body (see FIGS. 1 to 3). The pressure element 1 has a first chamber 4 and a second chamber 5. Both chambers 4, 5 are filled with a fluid (e.g., a gas or ordinary air). Arranged between the two chambers 4, 5 is a flexible diaphragm 20 (which is impermeable for the fluid in the interior of the pressure element 1), having an opening 35.

Upon a positive change in pressure of the fluid surrounding the pressure element 1, the bellows structure 34 is pressed together (in the axial direction in FIG. 4). The pressure increases in an interior of the second chamber 5. The opening 35 in the diaphragm 20 enables a pressure equalization current in the direction of the first chamber 4. On a sufficiently high rate of change in pressure (on a strong pressure surge), the flow resistance of the opening 35 is so great that the diaphragm 20 is deflected in the direction of the first chamber 4.

In turn, the diaphragm 20 is mechanically connected to a switching element formed as a MEMS-based switch 36 (MEMS=Micro-Electro-Mechanical Switch). If the diaphragm 20 moves in the direction of the MEMS-based switch 36, then the diaphragm 20 is deflected such that the switch 36 closes an electrical circuit 19. At the same time, this position of the switch 36 or a holder 41 (not shown in FIG. 4) of the switch 36 acts as overload apparatus 41 or as mechanical limit stop, which prevents a further (harmful) deflection of the diaphragm 20.

Once the press equalization current has subsided, the diaphragm 20 returns to its rest position, whereby the electrical circuit 19 is interrupted or opened again. The fluid in the interior of the pressure element 1 may be at a correspondingly high pressure in order to be able to adapt the working range of the pressure element 1 to the respective application.

By arranging the MEMS switch 36 on the other side of the diaphragm 20, it is also possible to record a negative change in pressure.

Figure 6:
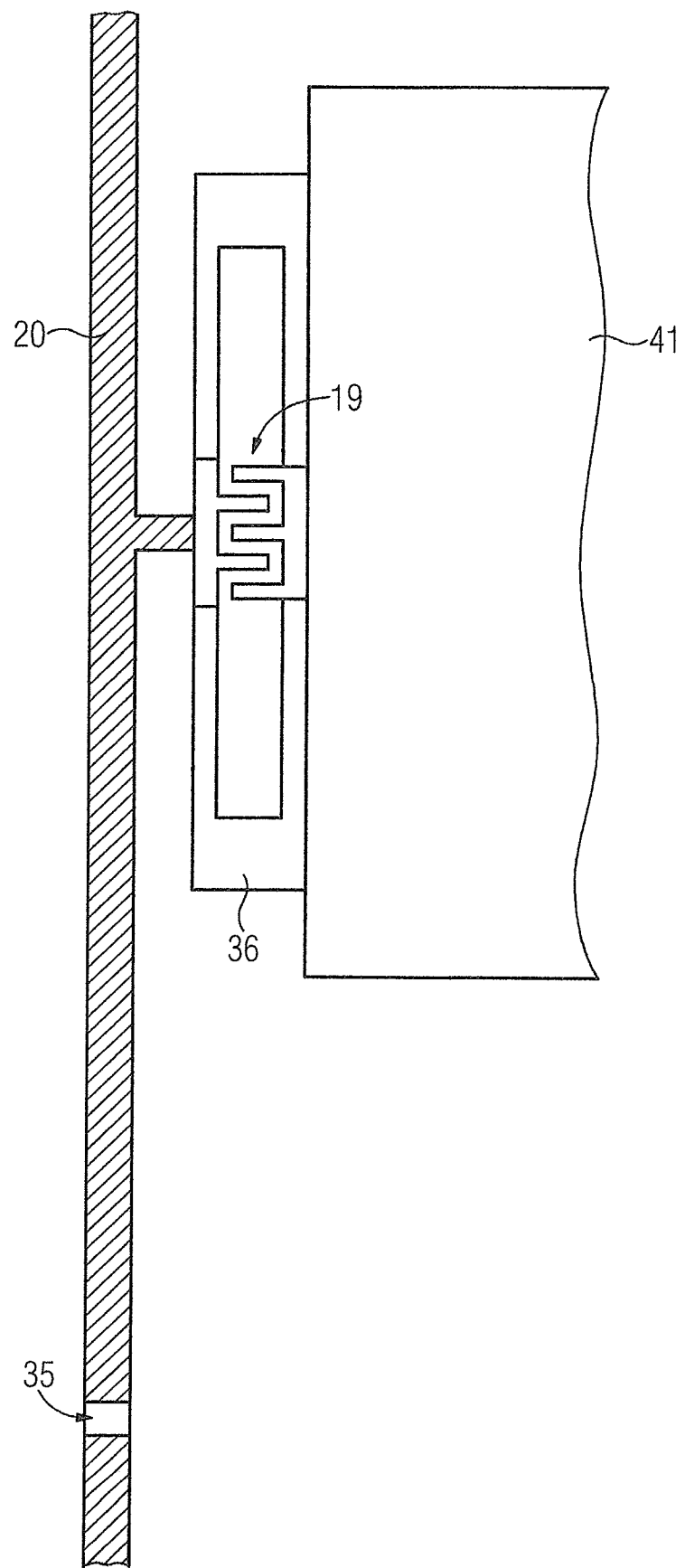
FIG. 6 shows a diaphragm with an associated switching element for a pressure element in accordance with the invention.

In FIG. 5, another perspective of the pressure element 1 from FIG. 4 is shown (rotated by 90 degrees about the longitudinal axis). FIG. 6 shows a MEMS switch 36 for use for the pressure element 1 in detail. It can be easily seen that the diaphragm 20 is directly connected to the switch 36, in order to close an electrical circuit 19 on a corresponding deflection of the diaphragm 20. The MEMS switch 36 is fastened to a holder 41.

Figure 7:
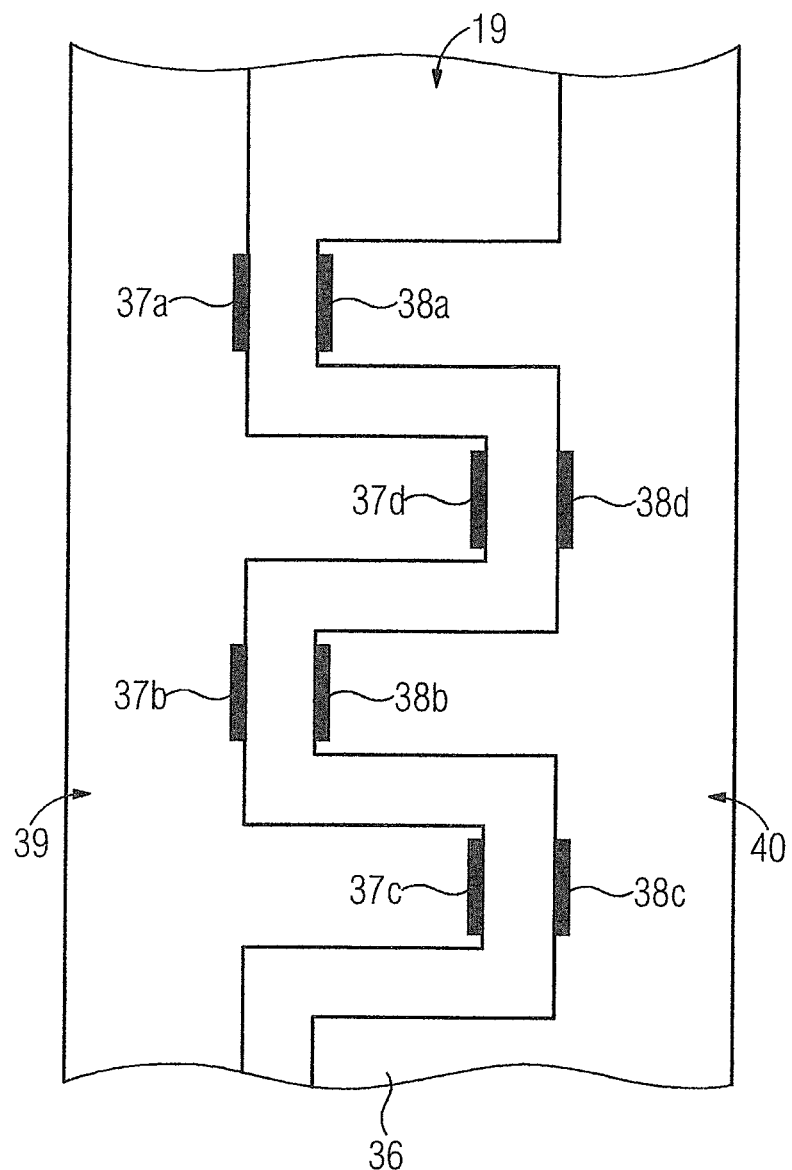
FIG. 7 shows a detailed enlarged view of FIG. 6.

The electrical circuit 19 is depicted in FIG. 7 by way of example. The electrical circuit 19 comprises four contacts 37a, 37b, 37c, 37d on a first side 39 (on the left in FIG. 7) and four mating contacts 38a, 38b, 38c, 38d on a right side 40 (on the right in FIG. 7).

Figure 8:
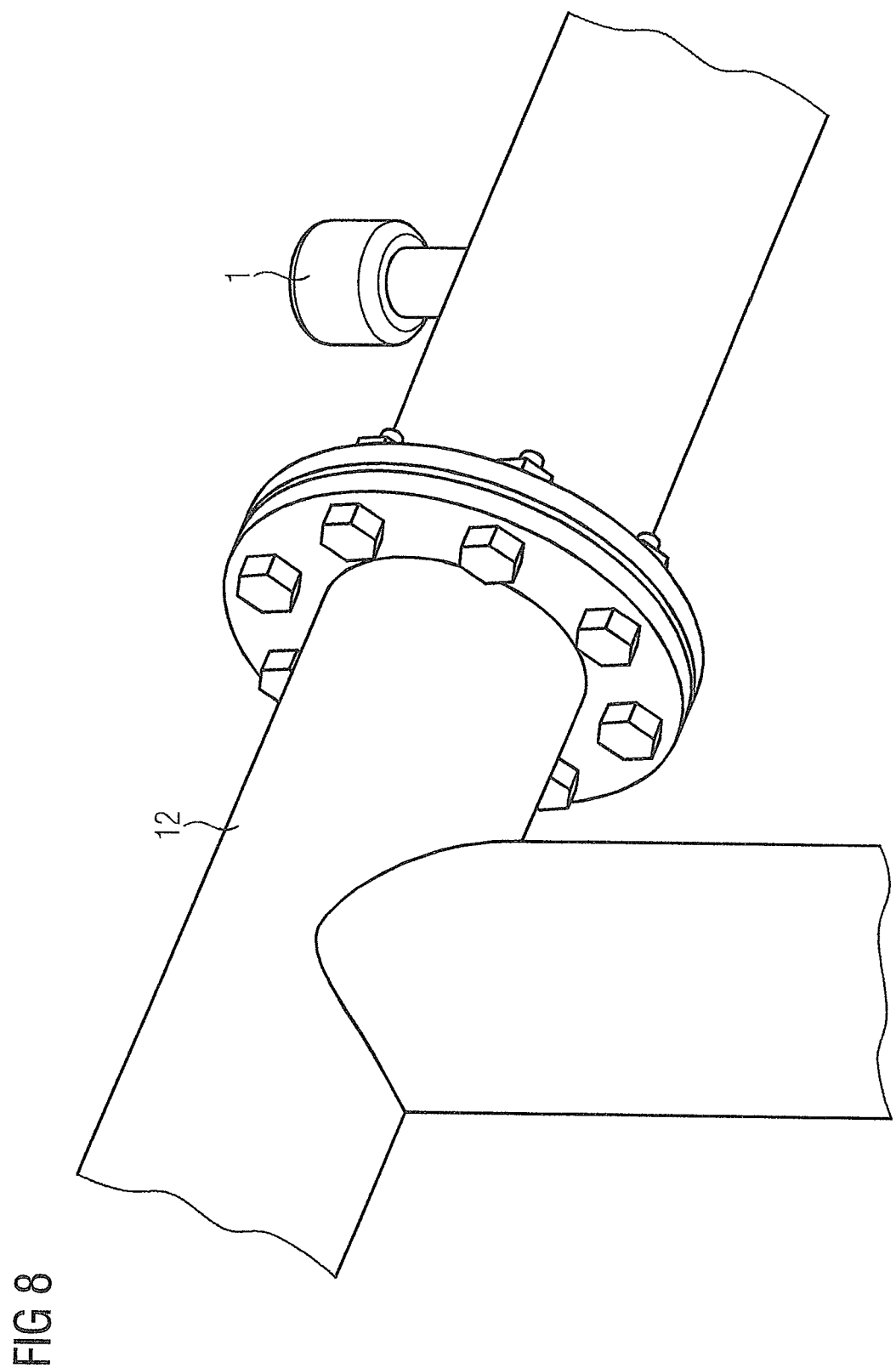
FIG. 8 shows a pipeline in accordance with the invention.

In FIG. 8, a pipeline 12 through which fluid can flow is shown, which is fluidically connected to the pressure element 1 in accordance with the disclosed embodiments of the invention.

Although the invention has been illustrated and described in greater detail by the preferred exemplary embodiment, the invention is not limited by the examples disclosed and the person skilled in the art will be able to derive other variations on this basis without moving beyond the scope of protection of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A pressure element for monitoring a fluid being applied to the pressure element, the pressure element comprising:
    an electrical circuit;
    wherein the pressure element is configured to close the electrical circuit, as a result of a change in pressure which the fluid exerts on the pressure element, independently of an absolute value of the pressure; and
    wherein the fluid flows through a pipeline.

2. The pressure element as claimed in claim 1, wherein the pressure element is configured to close the electrical circuit automatically when the change in pressure of the fluid occurs, without utilizing an external electrical energy source.

3. The pressure element as claimed in claim 2, wherein the pressure element is configured to close the electrical circuit when a threshold value according to an amount of the change in pressure of the fluid is exceeded.

4. The pressure element as claimed in claim 1, wherein the pressure element is configured to close the electrical circuit when a threshold value according to an amount of the change in pressure of the fluid is exceeded.

5. The pressure element as claimed in claim 1, further comprising:
    a switching element; and
    at least one flexible diaphragm having a connection to the switching element such that a movement of the diaphragm leads to a movement of the switching element to close the electrical circuit upon a corresponding movement of the diaphragm.

6. The pressure element as claimed in claim 5, further comprising:
    a first switching element;
    a first flexible diaphragm having a connection to the first switching element such that, as a result of a positive change in pressure of the fluid, the first diaphragm and the first switching element are moved such that the electrical circuit is closed;
    a second switching element; and
    a second flexible diaphragm having a connection to the second switching element such that, as a result of a negative change in pressure of the fluid, the second diaphragm and the second switching element are moved such that the electrical circuit is closed.

7. The pressure element as claimed in claim 6, further comprising:
    an overload apparatus which is configured to prevent an excess mechanical loading on the at least one diaphragm.

8. The pressure element as claimed in claim 6, further comprising:
    at least a first chamber and a second chamber;
    wherein the diaphragm and the switching element are arranged in a central region between the first and second chambers.

9. The pressure element as claimed in claim 5, further comprising:
    an overload apparatus which is configured to prevent an excess mechanical loading on the at least one diaphragm.

10. The pressure element as claimed in claim 9, further comprising:
    at least a first chamber and a second chamber;
    wherein the diaphragm and the switching element are arranged in a central region between the first and second chambers.

11. The pressure element as claimed in claim 5, further comprising:
    at least a first chamber and a second chamber;
    wherein the diaphragm and the switching element are arranged in a central region between the first and second chambers.

12. The pressure element as claimed in claim 11, further comprising:
    at least one additional third chamber, which has a first opening to the first chamber and a second opening to the second chamber;
    wherein the first and second openings have flow cross-sections which differ from one another.

13. The pressure element as claimed in claim 11, wherein the diaphragm has an opening for a fluid to flow through.

14. The pressure element as claimed in claim 11, further comprising:
    a compressible deforming facility arranged in the first chamber and configured to reversibly change volume as a function of a pressure exerted upon said compressible deforming facility.

15. The pressure element as claimed in claim 14, wherein the compressible deforming facility is a deforming body.

16. The pressure element as claimed in claim 14, wherein the compressible deforming facility has a subchamber which is separated from the first chamber from a flow perspective and comprises a spring and a piston; and
    wherein the piston is configured to exert a force on the spring when a force is exerted upon said piston, such that a volume of the subchamber and thus of an entire volume of the compressible deforming facility is reversibly altered.

17. The pressure element as claimed in claim 14, wherein the compressible deforming facility comprises a bellows structure which is reversibly compressible when pressure of the fluid being applied to the pressure element changes.

18. The pressure element as claimed in claim 1, further comprising:
    a flexible separating diaphragm which is configured such that the fluid is applicable to a first side of the separating diaphragm, and a fluid situated within the pressure element is applicable to a second side of the separating diaphragm.

19. A pipeline, through which a fluid flows, and which include at least one pressure element as claimed in claim 1, which is connected to the pipeline.

20. A pressure surge detection unit, comprising the pressure element as claimed in claim 1 and a control unit, which is configured to record a closing of the electrical circuit of the pressure element.

21. A pressure surge monitoring system for pipelines through which fluid flows, comprising a plurality of pressure elements as claimed in claim 1 and at least one control unit, which is configured to record a closing of the electrical circuit of the pressure element.

22. The pressure element as claimed in claim 1, wherein the pressure element monitors a pipeline through which fluid flows.

\* \* \* \* \*